Figure 1A:
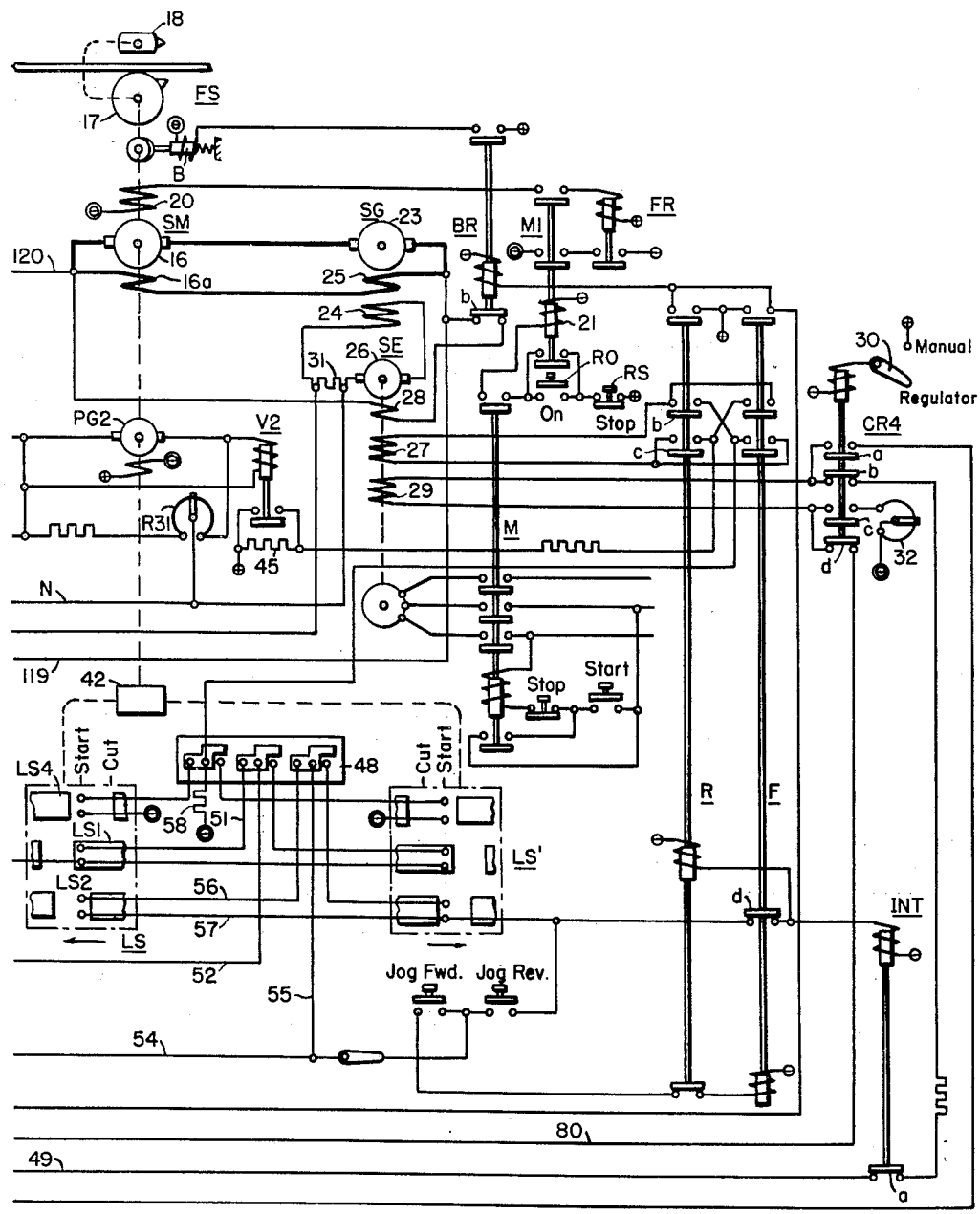

April 14, 1953 — W. SCHAELCHLIN — 2,634,811
CONTROL SYSTEM FOR CUTTING APPARATUS
Filed Feb. 25, 1949 — 3 Sheets-Sheet 1
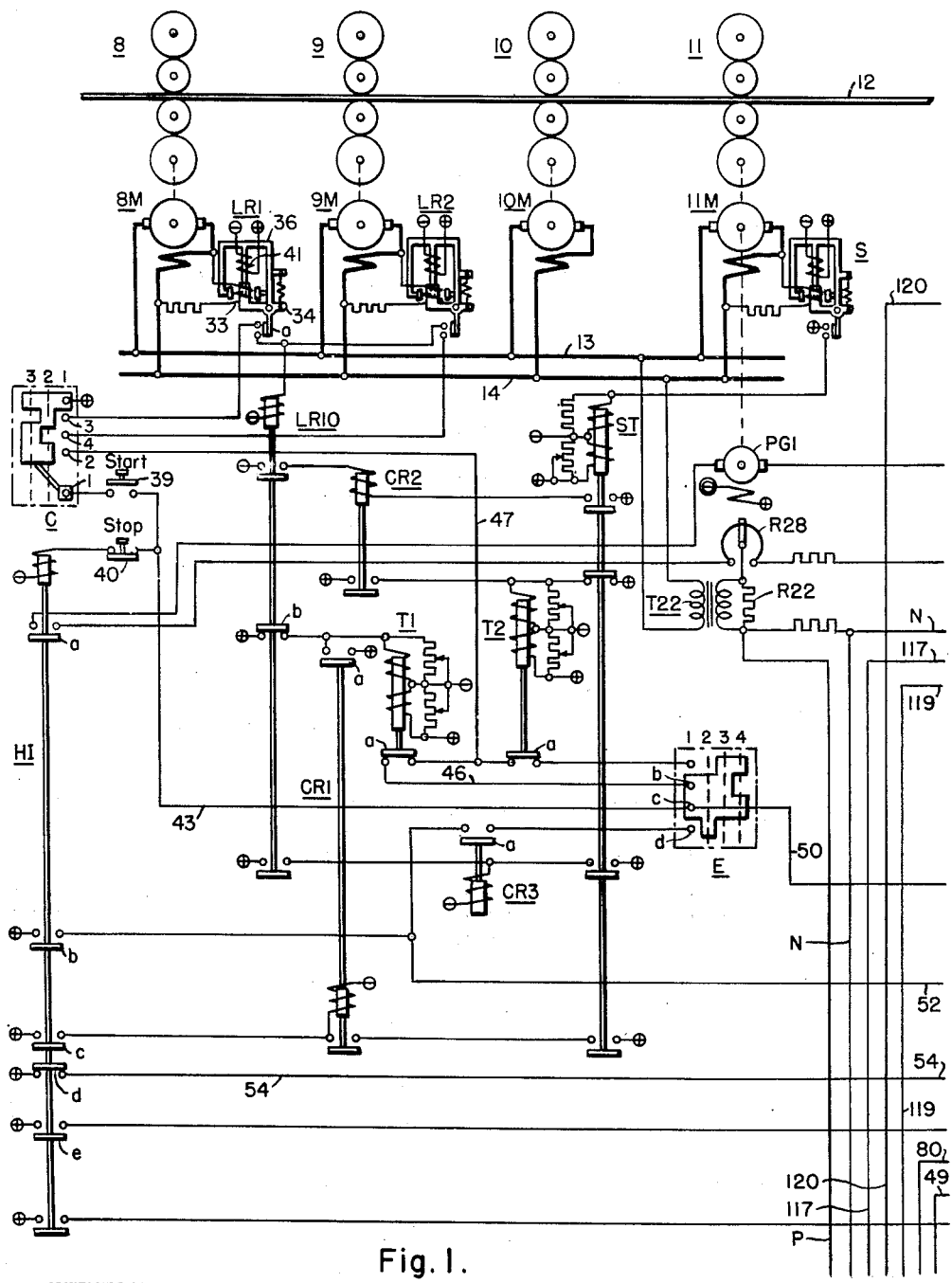
Fig. I.
WITNESSES:
Robert C. Baird
G. V. Giolma
INVENTOR
Walter Schaelchlin.
BY
G. W. Crawford
ATTORNEY April 14, 1953     W. SCHAELCHLIN     2,634,811
CONTROL SYSTEM FOR CUTTING APPARATUS
Filed Feb. 25, 1949     3 Sheets-Sheet 3

WITNESSES:
Robert C. Baird
F. V. Giolma

INVENTOR
Walter Schaelchlin.
BY
G. M. Crawford
ATTORNEY

Patented Apr. 14, 1953

2,634,811

UNITED STATES PATENT OFFICE 2,634,811

CONTROL SYSTEM FOR CUTTING APPARATUS

Walter Schaelchlin, Buffalo, N. Y., assignor to Westinghouse Electric Corporation, East Pittsburgh, Pa., a corporation of Pennsylvania Application February 25, 1949, Serial No. 78,248

17 Claims. (Cl. 164—68)

My invention relates, generally, to control systems for cutting apparatus, and it has reference in particular to a control system for a flying shear or the like, such as may be used to cut a strip or length of material as it proceeds from a strip mill or other work device.

Generally stated, it is an object of my invention to provide, for use with material cutting apparatus, a control system that is simple and inexpensive to manufacture, and is reliable and effective in operation.

More specifically, it is an object of my invention to provide, in a control system for a flying shear or the like, for utilizing a sensitive electronic regulator for controlling the excitation of a generator supplying electrical energy for driving the shear motor in accordance with the speed of a strip of material which is to be cut.

Another object of my invention is to provide, for cutting apparatus, a flexible control system of such nature that the cutting apparatus may be utilized to perform accurately a relatively large number of different cutting operations.

Yet another object of my invention is to provide, in a control system for a flying shear, for rapidly accelerating the shear motor to match the speed of the material proceeding from a strip mill or other work device, and perform a cutting operation thereon.

It is also an object of my invention to provide, in motor-driven cutting apparatus, for regulating the operation of the driving motor so as to run it in different predetermined speed relations to a strip of material upon which a cutting operation is to be performed.

It is also an object of my invention to provide in a control system for cutting apparatus utilizing different arrangements of cutting rolls, for cutting different ranges of lengths of a strip of material, and for reconnecting the control equipment of the cutting apparatus for operation with said different rolls.

One important object of my invention is to provide, in a control system for a flying shear or the like, for controlling the operation of the shear in predetermined timed relation with changes of load on the motor driving a roll stand or other work device operating on the strip of material which is to be cut.

Another important object of my invention is to provide, in a control system for a flying shear, for utilizing interchangeable cutting rolls of different diameters in connection with a common cutting roll for extending the cutting range of the shear.

I further propose to provide, in a control system for a motor-operated shear, for controlling the operation of the shear in accordance with a differential between the speeds of the shear and of the strip of material which is to be cut.

Other objects will in part be obvious, and will in part be described hereinafter.

In accordance with one embodiment of my invention, a flying shear for use with a strip mill is driven by a shear motor having a field winding energized from a suitable control bus, and an armature supplied with electrical energy from a shear generator. Field excitation for the shear generator is supplied by an exciter having a differential "killer" field winding, a positioning field winding, and a main or regulating field winding, the energization of which is controlled either manually, or by a sensitive electronic regulator in accordance with a differential between reference voltages proportional to the speed of the strip as it leaves the mill, and the speed of the shear, respectively. Load relays associated with the motors of one or more of the roll stands of the mill preceding the shear, initiate operation of the shear by setting up a timing circuit for connecting the regulator to start the shear motor. A limit switch operatively connected with the shear disconnects or removes the strip speed reference voltage from the regulator in predetermined timed relation to a cutting operation, connects the exciter differential field winding for energization, and connects the exciter reversing or positioning field winding to stop the shear and return it to the initial position in which it is held by a brake. A shear operation switch renders the limit switch ineffective to stop the shear when it is desired to cut the strip in predetermined lengths, and connects an additional timing circuit for effecting operation of the shear to crop the tail end of the strip when such operation is desired.

Figure 1B:
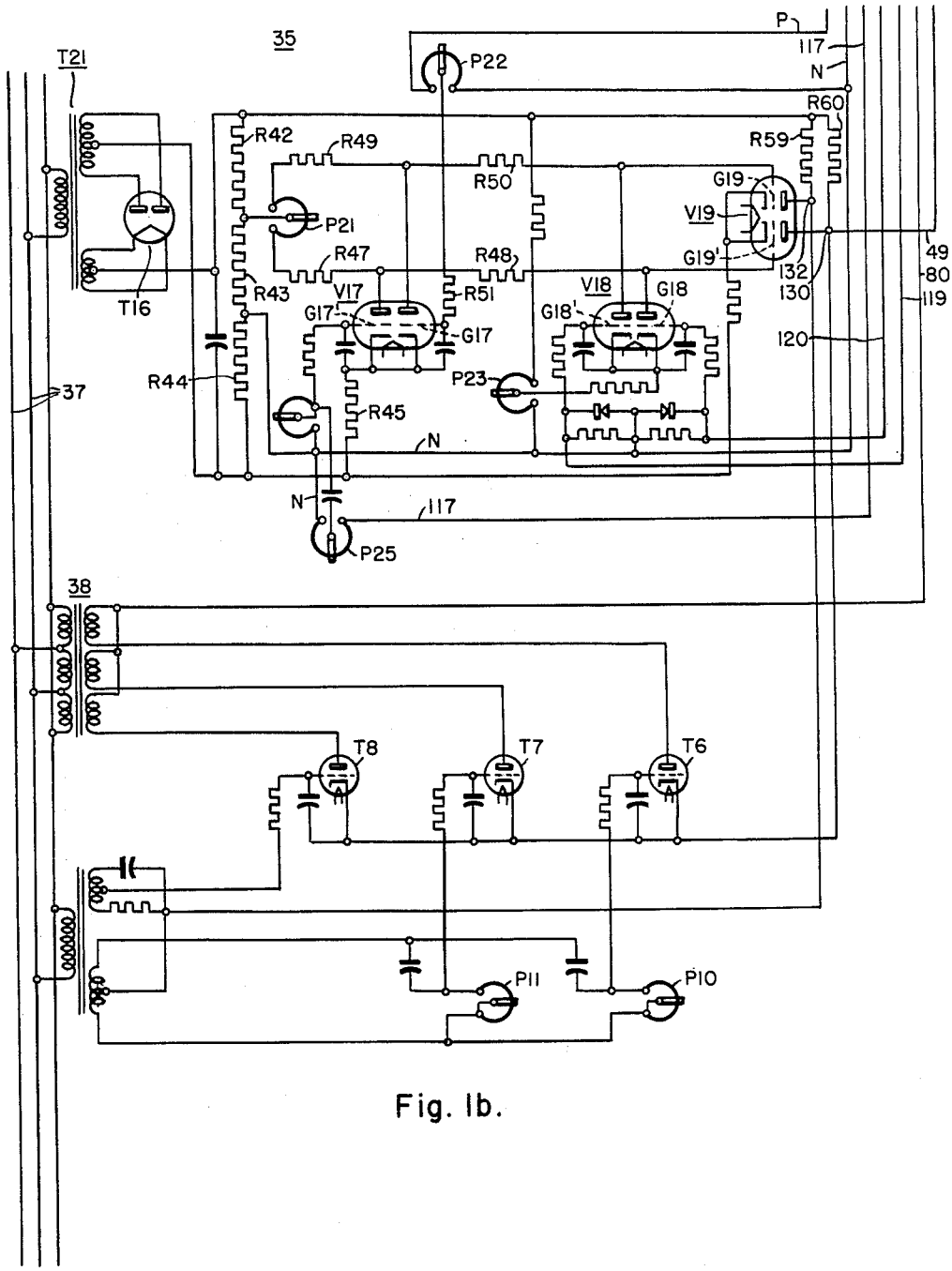

For a more complete understanding of the nature and scope of my invention, reference may be made to the following detailed description, which may be read in connection with the accompanying drawings, in which:

Figures 1 and 1a when placed side by side are a diagrammatic view of a flying shear control system embodying the invention in one of its forms (with the exception of the shear regulator); and Fig. 1b is a diagrammatic view of an electronic shear regulator disposed to be used in connection with the system of Figs. 1 and 1a.

Referring generally to the drawings, the reference numerals 8, 9, 10 and 11 denote the 8th, 9th, 10th and 11th roll stands, respectively, of a tandem strip mill for rolling a continuous length or strip of material 12 which is to be cut by a flying shear FS. The roll stands 8 through 11 are provided with suitable driving means, such as the motors 8M, 9M, 10M and 11M, respectively, which may be supplied with electrical energy from a suitable mill bus represented by the conductors 13 and 14. The field excitation of the mill motors may be supplied in any suitable manner. For reasons of simplicity, the field windings of the roll motors are not shown.

The flying shear FS is provided with a driving motor SM having an armature 16 connected in driving relation with the lower cutting roll 17 of the shear, a series commutating field winding 16a, and a main field winding 20. The main field winding 20 is connected to a suitable source of electrical energy represented by the positive and negative terminal connections, by means of a field contactor M1 having an operating winding 21, the energization of which may be controlled by means of a ready switch R having "on" and "stop" push buttons RO and RS.

The armature 16 of the shear motor may be supplied with electrical energy from a shear generator SG, having an armature 23 disposed to be connected in circuit relation with the armature 16, and having main and commutating field windings 24 and 25, respectively. The commutating field winding 25 is connected in series circuit relation with the armatures 23 and 16 and the commutating winding 16a, while the main field winding 24 is connected to be supplied with electrical energy from a shear exciter SE, comprising an armature 26, a reversing or positioning field winding 27, a "differential killer" field winding 28, and a main or regulating field winding 29.

The positioning field winding 27 may be connected by means of "forward" and "reverse" relays for jogging or positioning the shear. The "killer" field winding 28 may be connected across the commutating field windings 16a and 25 through a back contact b of the brake relay BR, so as to assist in reducing the output voltage of the shear exciter when the shear is being brought to a stop.

The main or regulating field winding 29 may be connected by means of an auxiliary control relay CR4 controlled by a manual-regulator speed control selector switch 30, either to a manually operated rheostat 32, or to an electronic regulator 35, for controlling the operation of the shear motor.

The electronic regulator 35 may comprise, for example, a transformer T21, which is connected to a source of alternating current represented by the conductors 37 in conjunction with a rectifier device T16 for producing a direct-current control potential, which is selectively applied to resistors R59 and R60 through a potentiometer P21 and the elements of a double element valve device V19, to produce a differential control voltage.

A voltage divider comprising resistors R42, R43 and R44 is connected across the output side of the rectifier device T16, and a portion of the voltage across this divider is applied through resistors R49 and R50 to control grid G19 of the valve device V19, and through resistors R47 and R48 to the control grid G19' thereof for producing a differential between the voltage drops across resistors R59 and R60.

Valve devices V17 and V18 are connected to selectively control the currents through, and the drops across the resistors R47, R49 and R48, R50, respectively. The differential voltage across the resistors R59 and R60 is applied through phase adjusting potentiometers P10 and P11 to the control grids of a plurality of electronic devices T6, T7 and T8 which are connected in conjunction with an anode transformer 38 for controlling the energization of the main or regulating field winding 29 of the exciter SE.

To compensate for variations in voltage of the bus conductors 13, control means such as the transformer T22 may be connected between the conductors to apply a control voltage pulse across a resistor R22 connected in circuit relation with the potentiometer R28 and the conductor P, to anticipate the effect of the change on the regulator 35.

In order to provide for controlling the operation of the shear motor in accordance with the speed of the strip of material 12, pilot generators PG1 and PG2 may be utilized. These generators may be connected in driving relation with the roll motor 11M and the shear motor SM for producing voltages proportional to the speeds thereof, the speed of the roll motor 11M being definitely related to the speed of the strip 12. The voltages of the pilot generators may be applied to the regulator 35 in opposition, so as to control the operation of the regulator in accordance with a differential therebetween.

For example, the output voltage of the pilot generator PG1 is applied across a potentiometer R28, which may be operated to vary the proportion of the voltage applied to the regulator, in order to compensate for different diameters of rolls in the roll stand 11. The output voltage of the pilot generator PG2 is applied to the regulator 35 through a potentiometer device R31, which may be adjusted to vary the proportion thereof applied to the regulator, so as to run the flying shear FS in different predetermined speed relations with the speed of the strip 12, for cutting different lengths thereof.

The differential between these voltages is applied through conductor P, and conductors N and 128 to the regulator through a sensitivity potentiometer P22, being applied to the grid G17 of valve device V17. An anti-hunt potential is derived from across a resistor 31 in the armature circuit of the exciter SE, and is applied through conductor 117 and potentiometer P25 to the grid G17' of valve device 17 to limit hunting. A current limit potential is derived from across the series field windings 16a and 25, and is applied to the grids G18 and G18' of valve device V18 through conductors 129 and 119 to provide a cut-off bias for limiting the excitation of the main field winding 29 of the exciter SE to hold the armature current of the shear motor SM below a predetermined maximum value.

In order to provide for controlling the operation of the shear FS, control means such as the load relays LR1, LR2 and S are provided, being, for example, selectively responsive to predetermined load conditions of the motors 8M, 9M, and 11M respectively, such as may be determined by the load on the motor when the strip 12 is between the rolls of the corresponding roll stand. The relays are each provided with operating windings 33 associated with movable core members 34 pivotally mounted on stationary core members 35 having polarizing windings 41.

An auxiliary load relay LR10 is provided for operation in conjunction with either of the load relays LR1 or LR2, for initiating the time interval of a timing relay T1, for effecting operation of a high speed control relay HI to connect the pilot generator PG1 to the regulator 35. An auxiliary control relay CR1 provides a holding circuit for the T1 relay in conjunction with a time delay relay ST associated with the relay S.

An additional time delay relay T2 is provided in conjunction with a control relay CR2 and the auxiliary time delay relay ST for operating the high relay HI in conjunction with the load relay S for cropping the tail end of the strip.

A shut-down auxiliary control relay CR3 is provided for operation in conjunction with the time delay relay ST for shutting the shear down. A voltage relay V2 is connected across the pilot generator PG2 for shunting a resistor 45 to vary the excitation of the positioning field winding 27 of exciter SE with shear speed.

To provide a flexible control system, a manual-automatic start control switch C is provided for selectively connecting the auxiliary load relay LR10 for operation in conjunction with one or the other of the load relays LR1 or LR2, or for connecting the high speed control relay HI for operation in conjunction with a manual "start" push button switch 39 and a "stop" push button switch 40.

Different cutting operations may be effected by means of a shear operation control switch E having operating positions 1, 2, 3 and 4, which may be operated to control the connection of the time delay relays T1 and T2, for effecting operation of the high speed control relay HI to either (1) crop the front end, (2) crop the front end and cut the strip to length, (3) crop the front and tail ends, and (4) crop the tail end only.

To provide for control of the flying shear FS, a pair of limit switches LS and LS' are provided for interrupting the energizing circuit of the control relay HI, and effecting operation of the reverse relay R to return the shear to its initial position. The limit switches LS and LS' may be operatively connected to the lower cutting roll 17 of the shear through suitable gear means 42 disposed to provide different gear ratios therebetween.

In order to provide for extending the range of the shear, the upper roll 18, which is connected in geared relation with the lower cutting roll 17, is made removable, so as to be replaceable by an alternate upper roll having a different diameter and connected in geared relation with the lower roll by a gear of a correspondingly different diameter.

The limit switches LS and LS' function to interrupt the energizing circuit for the control relay HI in different predetermined relations with the lower cutting roll 17, corresponding to the different gear ratios between the lower and upper rolls. For example, the upper cutting roll 18 may be disposed to turn through three revolutions while the lower cutting roll 17 turns through two revolutions and the limit switch LS turns a single revolution, whereas, the alternate upper cutting roll (not shown) may be disposed to turn through four revolutions while the lower cutting roll 17 turns through three revolutions and the limit switch LS' turns through a single revolution. A limit switch selector switch 48 is provided for selectively connecting the limit switch LS or the limit switch LS' in circuit relation with the control relay HI, depending on which arrangement of the cutting rolls is being used. A field loss relay FR is utilized to provide for deenergizing the control circuits in the event of a loss of field on the shear motor.

In describing the operation of the shear, it will be assumed that the sources represented by the positive and negative terminal markings are in an energized condition, and that the manual-automatic regulator switch 39 is actuated to the position shown, for controlling the operation of the shear motor by means of the regulator 35. The auxiliary control relay CR4 will, therefore, be in the energized position. The time delay relays T1 and T2 will also be in energized positions. With the mill running, the pilot generator PG1 will be producing an output voltage proportional to the speed of the mill, while the pilot generator PG2 will be at a standstill.

If it is desired to crop the front end of the strip only, and to utilize the automatic starting feature, the shear operation switch E will be actuated to the number 1 position as shown, while the manual-automatic start control switch C will be operated to the number 2 position.

As the strip 12 enters stand 8, the load relay LR1 picks up to complete a circuit for the auxiliary load relay LR10, through contact members $a$ and the manual-automatic control switch C. Relay LR10 completes an energizing circuit for the auxiliary control relay CR3, and interrupts the energizing circuit for the time delay relay T1 at contact members $b$. After a predetermined time, time delay relay T1 drops out, and completes an energizing circuit for the high speed control relay HI, extending from negative through the operating winding of relay HI, the "stop" push button switch 40, conductor 43, contact members $c$ and $b$ of the shear operation switch E, conductor 46, contact members $a$ of relay T1, conductor 47 and start control switch C, to positive.

Operation of the control relay HI connects the pilot generator PG1 to the regulator 35 through contact members $a$ of relay HI, and provides an energizing circuit for the auxiliary control relay CR1 through contact members $c$. A holding circuit for the HI relay is provided from contact member $c$ of the switch E through conductor 50, segment LS1 of the limit switch LS, conductor 51, segment $b$ of switch F, conductor 52 and contact members $b$ of relay HI to positive. Relay CR1 reenergizes the timing relay T1 through contact members $a$. The brake relay BR is energized through contact members $e$ of relay HI, and operates to release the brake B.

The connection of the pilot generator PG1 to the regulator 35 supplies a control voltage to the control grid G17 through contact members $a$ of relay HI, conductor P, sensitivity adjusting potentiometer P22, and resistor R51. This causes the associated section of valve device V17 to conduct, thus producing a voltage drop across the resistor R49, and in the cathode resistor R45. Increased current in the cathode resistor R45 operates as a bias in the grid cathode circuit of valve device V17. This bias makes the grid G17' more negative, and consequently reduces the anode current in resistor R47. Accordingly, the grid G19 of tube number V19 becomes more negative, and grid G19' becomes more positive.

A corresponding change occurs in the currents through the resistors R59 and R60, so that the drop in the resistor R59 is reduced, while that across R60 is increased, which makes the terminal 132 positive with respect to the terminal 130.

Valve device V18 is normally biased by a voltage obtained from the potentiometer P23. When the voltage applied from the series field windings 16a and 25 reaches a limiting value sufficient to overcome the cut-off bias, then plate current flows in either resistor R48 or the resistor R50 depending upon the polarity of the applied voltage. This polarity is chosen with respect to the input signal so that the proper section of valve V18 conducts in order to reduce the potential of the more positive of the terminals 130 or 132.

The power amplifier comprising the tubes T6, T7 and T8 will be rendered conductive in accordance with the voltage difference between the terminals 130 and 132, so as to effect energization of the regulating field winding 29 of the exciter SE, which is connected to the regulator through contact members $b$ and $d$ of the auxiliary control relay CR4, contact member $a$ of an interlock relay INT, and conductors 49 and 80. The exciter output voltage will, therefore, be at a maximum, and the exciter SE energizes the field winding 24 of the shear generator so as to accelerate the shear motor SM at a maximum rate to bring it up to a predetermined speed relation with the strip 12, as determined by the speed of the pilot generator PG1.

The limit switch LS is disposed to open the circuit through segment LS1 slightly ahead of the instant that the strip is cut by the cutting edges of the shear cutting rolls 17 and 18 engaging in cutting relation. This deenergizes the high speed control relay HI, whose holding circuit was completed through contact member LS1. The electronic regulator 35 will thereupon be disconnected from the reference voltage of the pilot generator PG1, causing the regulator to be subjected only to the voltage from the generator PG2, and hence reduce the current in the regulating field winding 29 to zero at a rapid rate.

Deenergization of relay HI completes an energizing circuit for the reverse relay R and the interlock relay INT, through contact members $d$ of relay HI, conductors 54 and 55, selector switch 48, conductor 56, segment LS2 of limit switch LS, conductor 57 and contact members $d$ of the forward relay F. The interlock relay INT disconnects the regulating field winding 29 from the regulator 35 at contact members $a$, and relay R completes the circuit of the positioning field winding 27 of the exciter SE through contact members $b$ and $c$, thereby reversing the polarity of the shear generator. Segment LS4 is connected in this circuit, and opens to insert a speed reducing resistor 58 in circuit with the field winding 27.

The limit switch LS subsequently interrupts the energizing circuit of the relay R, which extends through segment LS2, so that this relay drops out and releases the brake relay BR causing the brake to set. At the same time the "killer" differential field winding 28 of exciter SE will be connected across the commutating field windings 16a and 25 through contact members $b$ of the brake relay BR to assist in reducing the circulating currents in the armature circuit of the shear motor to a relatively low value so that the brake action is sufficient to lock the motor.

Should it be desired to crop the front end of the strip and cut it into predetermined lengths, the shear operation switch E may be operated to the number 2 position. The shear will be started in a manner similar to that described hereinbefore. The shear limit switch LS will now be rendered ineffective so far as segment LS1 is concerned, since contact member LS1 is shunted by contact members $c$ and $d$ of the shear operation switch E which are now connected by the switch segment, and contact members $a$ of the auxiliary control relay CR3.

When the limit switch LS reaches the position in which the circuit through LS1 is normally interrupted, the high-speed control relay HI will be maintained in the energized condition through a shunt circuit extending from contact member $d$ of the shear operation switch E, through contact members $a$ of relay CR3 and contact members $b$ of relay HI.

Accordingly, the shear motor SM will not only make the initial cut as described hereinbefore, but will continue to operate at a predetermined speed relative to the speed of the strip 12 as determined by the regulator 35, cutting the strip into predetermined lengths until the strip leaves roll stand 11. At this time the load relay S returns to the deenergized position, and interrupts the energizing circuit heretofore provided for the time relay ST through contact members $a$ of relay S. This relay ST is adjusted to drop out shortly after the strip has passed the shear and interrupts the energizing circuit for relay CR3. The shunt around the limit switch LS is thereupon removed, and the limit switch is rendered effective to stop the shear in the manner previously described.

In order to merely crop both the front and the tail ends of a strip, the shear operation switch E may be operated to the number 3 position to make both of the time relays T1 and T2 effective. After starting the shear and making the first or crop cut, the shear is automatically shut down by the limit switch LS as described in connection with the first operation, since the by-pass circuit around the limit switch described in the second operation is no longer effective.

Nothing further happens until the strip leaves roll stand 8. At this moment the load relay LR1 will be deenergized, dropping the auxiliary load relay LR10, and interrupting the energizing circuit of the auxiliary control relay CR2. This provides an obvious energizing circuit for the time delay relay T2, which after a predetermined time returns to the deenergized position and completes an energizing circuit for the control relay HI through the shear operation switch E and contact members $a$ of relay T2. Relay HI connects the pilot generator PG1 to the regulator 35 in the manner hereinbefore described, and starts the shear motor SM so as to crop the tail end of the strip 12. The limit switch LS interrupts the energizing circuit of the control relay HI, and the shear is stopped in the manner hereinbefore described.

If it is desired to crop the tail end of the strip only, the shear operation switch E may be operated to the number 4 position, in which the circuit normally completed by relay T1 for the control relay HI is interrupted at contact member $b$ of switch E. Accordingly the initial cutting operation described in the preceding operation will be omitted and time delay relay T2 will be rendered effective, and only the tail end will be cropped.

Provision is made for manually initiating the starting of the shear by momentarily closing the "start" push button control switch 39 to energize the control relay HI. The rest of the sequence is substantially identical with the description given for the automatic control. The shear may be stopped at any time by operating the "stop" push button switch 40 to deenergize relay HI.

In the event it is desired to control the operation of the shear manually, the selector switch B may be operated to the manual position, in which position the relay CR4 will be energized. This disconnects the regulating field winding 29 from the regulator 35 at contact members b and d, and connects it to the manual rheostat 32 through contact members a and c.

From the above description and the accompanying drawings it will be apparent that I have provided, in a simple and effective manner, for controlling the operation of a flying shear or other cutting apparatus for performing cutting operations on a strip of material proceeding from a tandem mill or the like. By using an electronic regulator for controlling the operation of the shear motor in accordance with a differential between the speeds of the strip and the cutting rolls of the shear, rapid acceleration of the shear is possible, and a continuous strip may be accurately cut to predetermined lengths by running the shear either at or above the speed of the strip. A control system embodying the features of my invention is flexible and may be readily adapted to different types of cutting apparatus, and not intended to be limited to the specific application hereinbefore described.

Since certain changes may be made in the above described construction and different embodiments of the invention without departing from the spirit or scope thereof, it is intended that all the matter contained in the above description and shown in the accompanying drawings shall be contained as illustrative and not in a limiting sense.

I claim as my invention:

1. In a control for cutting apparatus for a moving strip of material, a motor disposed to be connected in driving relation with the cutting apparatus, generating means normally connected for supplying electrical energy to the motor, a single regulating means, circuit means normally connecting the regulating means to regulate the output of the generating means in accordance with the speed of the cutting apparatus to stop said cutting apparatus in an initial position, control means operable to connect the regulating means to regulate the output of the generating means in accordance with a differential between the speed of the strip and the speed of the cutting apparatus so as to render the regulating means effective to start the cutting apparatus, and switch means operable in accordance with the position of the cutting apparatus to render said control means inoperative and stop the motor.

2. The combination with a motor disposed to be connected in driving relation with cutting apparatus for a moving strip of material, of generating means connected directly to the motor to supply electrical energy to the motor, electronic speed regulating means, circuit means connecting the regulating means to reduce the output voltage of the generating means in accordance with the speed of the cutting apparatus, switch means operable to connect the regulating means to control the output of the generating means in accordance with the speed of the strip in opposed relation to the speed of the cutting apparatus and bring the speed of the cutting apparatus into predetermined relation with that of the strip, control means responsive to a predetermined disposition of the strip with respect to the cutting apparatus to render the switch means operable, and a limit switch connected in driving relation with the cutting apparatus operable to stop said cutting apparatus.

3. In combination with a motor disposed to be connected in driving relation with cutting apparatus for cutting a moving length of strip material proceeding from a work device, generating means connected to supply electrical energy to the motor, an electronic regulator, circuit means connected to apply to the regulator a voltage proportional to the speed of the cutting apparatus so as to reduce the output voltage of the generating means, control means operable to apply to the regulating means an opposed voltage proportional to the speed of the strip so as to render the regulating means responsive to a differential between the speeds of the motor and the work device to accelerate the cutting apparatus and produce a predetermined speed relation between the cutting apparatus and the strip of material, and switch means responsive to the operation of the cutting apparatus operable to render the control means inoperative and the regulator operable to stop the shear motor.

4. The combination in a control system for cutting apparatus for cutting moving material proceeding from a work device driven by an electric motor, of a motor disposed to be connected in driving relation with the cutting apparatus, generating means normally connected in direct circuit relation with the cutting apparatus motor to supply electrical energy to the motor, pilot generators operable to produce voltages responsive to the speeds of the cutting apparatus motor and the work device motor, a single regulator normally responsive to one of said voltages to regulate the generating means to reduce the voltage thereof and responsive to a differential between a portion of said voltages disposed to be connected to regulate the generating means so as to bring the cutting device directly into predetermined speed relation with the work device, and control means operable in response to a predetermined value of armature current of the work device motor to effect connection of the regulator to respond to said differential and accelerate the cutting apparatus into the predetermined speed relation.

5. In a control system for performing cutting operations on a moving length of material, a motor connected in driving relation with the cutting apparatus, a generator connected to supply electrical energy to the motor, an exciter connected to supply excitation for the generator and having a field winding, an electronic regulator responsive to a differential between the speed of the motor and of the material connected to effect the sole energization of the exciter field winding to establish a predetermined speed relation between the cutting apparatus and the material, a brake device, switch means operable to disconnect the field winding from the regulator, and limit switch means connected in driving relation with the cutting apparatus operable to effect operation of the brake device and the switch means.

6. In a control system for cutting apparatus having a motor connected in driving relation therewith for operating it to perform a cutting operation on a length of material proceeding from a work device, generating means connected to supply electrical energy to the motor including an exciter having a plurality of field windings, a regulator selectively responsive to the speeds of the cutting apparatus and the length of material operable to produce a voltage varying in accordance with a differential between the speed of the material and a predetermined speed relation of the cutting apparatus and the material, control means operable to selectively connect one of the exciter field windings to the regulator or to a source of substantially constant voltage, relay means operable to render the regulator effective, switch means operable to connect another of the exciter field windings for energization differentially with respect to said one field winding, and limit switch means connected in driving relation with the cutting apparatus operable to render the relay means inoperative and the switch means operative in predetermined relation to a cutting operation.

7. In a control system for cutting apparatus having a motor connected in driving relation therewith for performing a cutting operation on a moving length of material passing through a work device driven by an electric motor, generating means connected to supply electrical energy to the cutting apparatus motor, a single regulator normally connected to control the output voltage of the generating means, a limit switch connected in driving relation with the cutting apparatus normally effective to render the regulator operative to reduce the output voltage of the generating means in predetermined relation to a cutting operation, control switch means operable to render the limit switch ineffective, and control means responsive to a reduction in armature current of the work device motor upon the material leaving the work device connected in circuit relation with the control switch means to render the limit switch normally effective.

8. In a control system for cutting apparatus having a motor connected in driving relation therewith for performing a cutting operation on a length of material moving from a work device, generating means connected to supply electrical energy to the motor, a regulator, circuit means connected to effect operation of the regulator to control the output voltage of the generating means in accordance with the speeds of the cutting apparatus only, control means operable to connect the regulator for operation in accordance with a differential between the speeds of the cutting apparatus and the work device, timing means operable to effect operation of the control means to connect the regulator for operation in timed relation to the entrance of the material into the work device, and switch means connected in driving relation with the cutting apparatus operable to effect operation of the control means to disconnect the regulator to stop the cutting apparatus.

9. In a control system for a shear having a motor connected in driving relation therewith to perform a cutting operation on a length of material proceeding from a work device, a regulator, relay means selectively operable to connect the regulator to be selectively responsive to the speed of the shear alone or a differential between the speeds of the shear and the work device disposed to effect energization of the motor to run the shear in predetermined speed relation with the material, control means operable to effect operation of the relay means to connect the regulator to start the motor to perform a cutting operation in timed relation to passage of the material, and switch means connected in driving relation with the cutting apparatus to render the relay means inoperative in predetermined relation to a cutting operation so as to effect operation of the regulator to stop the shear.

10. In a control system for a motor connected in driving relation with cutting apparatus for performing a cutting operation on a length of material proceeding from a work device, a regulator selectively responsive to the speeds of the cutting apparatus and the work device disposed to effect energization of the motor to run the cutting apparatus in predetermined speed relation with the work device, timing means operable to effect connection of the regulator to start the cutting apparatus in predetermined timed relation to the entrance of the material into the work device, and additional timing means operable to effect connection of the regulator to start the cutting apparatus in predetermined timed relation to the material leaving the work device.

11. The combination in a control system for cutting apparatus having a rotatable lower cutting roll disposed to be driven by a motor and a plurality of interchangeable upper cutting rolls of different diameters connected in geared relation with the lower cutting roll by gears of correspondingly different diameters for performing cutting operations on a length of material moving from a work device, of a regulator selectively responsive to the speeds of the cutting apparatus and the work device, control means responsive to entrance of the material into the work device operable to connect the regulator to start the cutting apparatus, a plurality of limit switches connected in driving relation with the cutting apparatus in different geared relations each corresponding to the geared relation of a different upper cutting roll, and transfer means operable to selectively connect the different limit switches for disconnecting the regulator to stop the cutting apparatus in predetermined relation to cutting operations with the upper cutting rolls of different diameters.

12. A control system for cutting apparatus having a motor connected in driving relation for performing a cutting operation on a length of material proceeding from a work device comprising, a variable voltage generator connected to supply electrical energy to the motor, a pilot generator connected in driving relation with each of the cutting apparatus and the work device operable to produce a voltage proportional to the speed thereof, a regulator connected to control the output voltage of the variable voltage generator, circuit means connecting the pilot generators in opposition to apply a differential voltage therefrom to the regulator including control means normally interrupting the circuit means between the regulator and the work device pilot generator, said control means being operable to complete the circuit means in predetermined relation to the operation of the work device on the material, and a limit switch connected in driving relation with the cutting apparatus operable to control the operation of the control means to interrupt the connection of the regulator to the work device pilot generator while leaving it connected to the pilot generator of the cutting apparatus so as to utilize the regulator to reduce the voltage of the variable voltage generator to stop the cutting apparatus.

13. In a control system for cutting apparatus having a motor connected in driving relation therewith for performing a cutting operation on a length of moving material, generating means connected to apply a variable voltage to the motor, an exciter having a plurality of field windings connected to supply field excitation to the generating means, a regulator connected to supply excitation to one of said field windings, control means including a relay operable to connect the regulator to produce a voltage responsive to a differential between the speed of the cutting apparatus and a predetermined relation thereof to the speed of the material, control means operable to effect the operation of said relay, switch means operative in response to predetermined movement of the cutting apparatus to restore the relay to the non-operated position, brake means, and a control relay operable in response to operation of the switch means to effect energization of another of the field windings of the exciter differentially with respect to said one field winding and to render the brake means effective.

14. In a control system for a flying shear having a motor connected in driving relation therewith for performing a cutting operation on a length of moving material being worked on by a plurality of roll stands in tandem, a load relay responsive to the entrance of the material into one of the roll stands, an electronic regulator selectively responsive to a differential between the speed of the shear and a predetermined relation thereof to the speed of the roll stand disposed to be connected to effect energization of the shear motor to attain the predetermined speed relation, relay means operable to connect the regulator to effect energization of the motor as aforesaid, time delay means operable in response to operation of the load relay to provide an operating circuit for the relay means, a limit switch operatively connected to the shear, said limit switch being effective to disconnect the regulator and stop the shear, and control means operable to provide an operating circuit for the relay means a predetermined time after the material leaves one of said roll stands.

15. The combination in a control system for a shear having a motor connected in driving relation therewith for performing a cutting operation on a length of material passing through a plurality of roll stands arranged in tandem and each having a driving motor, of a variable voltage generator connected to supply electrical energy to the shear motor, an exciter connected to supply field excitation to the generator, a regulator connected to provide field excitation for the exciter, a load relay operable in response to a predetermined load on one of the roll stand motors, control means operable in response to operation of the load relay to connect the regulator to start the shear motor, switch means connected in driving relation with the shear to render the control means inoperative and stop the shear, and an additional load relay operable in response to a reduction in load on a subsequent one of the roll stands to effect operation of the control means to start the shear to crop the tail end of the material.

16. In combination in a control system for a shear having a motor connected in driving relation therewith for performing a cutting operation on a length of material being worked on by a roll stand having a motor connected in driving relation therewith and energized from a source of electrical energy, a single regulator disposed to control the energization of the shear motor to establish directly a predetermined final speed relation of the shear and roll stand, pilot generators connected in driving relation with the mill and shear motors to produce voltages proportional to the speeds thereof, circuit means connecting the pilot generators to apply a differential voltage to the regulator so as to effect energization of the shear motor to bring the shear up to a predetermined speed relative to the roll stand, and control means including a damping transformer connected to the source operable to apply to the regulator a compensating voltage in response to a change of voltage of the source.

17. In a control system for cutting apparatus having a motor connected in driving relation therewith for performing a cutting operation on a length of material proceeding from a work device having a motor connected in driving relation therewith and energized from a direct current source of electrical energy, a regulator connected to effect energization of the cutting apparatus motor, circuit means including means operable to produce voltages proportional to the speeds of the cutting apparatus and the work device connected to apply the differential therebetween to the regulator to effect energization of the cutting apparatus motor to operate the cutting apparatus in predetermined speed relation with the work device, and transformer means energized from the source connected to apply to the regulator a voltage in accordance with a change of voltage of the source.

WALTER SCHAELCHLIN.

References Cited in the file of this patent

UNITED STATES PATENTS

| Number | Name | Date |
|---|---|---|
| 1,991,083 | Dean | Feb. 12, 1935 |
| 2,298,877 | Edwards | Oct. 13, 1942 |